(12) United States Patent
Belli et al.

(10) Patent No.: US 12,314,365 B2
(45) Date of Patent: May 27, 2025

(54) ADAPTIVE PERSONALIZATION FOR ANTI-SPOOFING PROTECTION IN BIOMETRIC AUTHENTICATION SYSTEMS

(71) Applicant: QUALCOMM Incorporated, San Diego, CA (US)

(72) Inventors: Davide Belli, Diemen (NL); Bence Major, Amsterdam (NL); Amir Jalalirad, Eindhoven (NL); Daniel Hendricus Franciscus Dijkman, Haarlem (NL); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 18/155,408

(22) Filed: Jan. 17, 2023

(65) Prior Publication Data

US 2023/0259600 A1    Aug. 17, 2023

Related U.S. Application Data

(60) Provisional application No. 63/267,985, filed on Feb. 14, 2022.

(51) Int. Cl.
*G06F 21/32* (2013.01)
*G06N 20/00* (2019.01)
*G06V 40/40* (2022.01)

(52) U.S. Cl.
CPC .............. *G06F 21/32* (2013.01); *G06V 40/40* (2022.01); *G06N 20/00* (2019.01)

(58) Field of Classification Search
CPC ......... G06F 21/32; G06V 40/40; G06N 20/00
See application file for complete search history.

(56) References Cited

U.S. PATENT DOCUMENTS

2014/0093140 A1* 4/2014 Juveneton ............ G06V 40/173
382/117
2018/0254046 A1* 9/2018 Khoury ................... G10L 17/18
(Continued)

FOREIGN PATENT DOCUMENTS

CN         111680672 B      11/2020

OTHER PUBLICATIONS

C. Nagpal and S. R. Dubey, "A Performance Evaluation of Convolutional Neural Networks for Face Anti Spoofing," 2019 International Joint Conference on Neural Networks (IJCNN), Budapest, Hungary, 2019, pp. 1-8, doi: 10.1109/IJCNN.2019.8852422. (Year: 2019).*

(Continued)

*Primary Examiner* — Robert B Leung
(74) *Attorney, Agent, or Firm* — Patterson & Sheridan LLP

(57) ABSTRACT

Certain aspects of the present disclosure provide techniques and apparatus for biometric authentication using an anti-spoofing protection model refined using online data. The method generally includes receiving a biometric data input for a user. Features for the received biometric data input are extracted through a first machine learning model. It is determined, using the extracted features for the received biometric data input and a second machine learning model, whether the received biometric data input for the user is authentic or inauthentic. It is determined whether to add the extracted features for the received biometric data input, labeled with an indication of whether the received biometric data input is authentic or inauthentic, to a finetuning data set. The second machine learning model is adjusted based on the finetuning data set.

24 Claims, 9 Drawing Sheets

(56) References Cited

U.S. PATENT DOCUMENTS

| | | | |
|---|---|---|---|
| 2021/0141896 | A1 | 5/2021 | Streit |
| 2021/0209387 | A1* | 7/2021 | Nikitidis ............... G06V 10/764 |
| 2021/0279441 | A1* | 9/2021 | Park ......................... G06N 3/04 |
| 2021/0326617 | A1 | 10/2021 | Feng et al. |
| 2022/0318349 | A1* | 10/2022 | Wasnik ................ G06V 40/174 |
| 2023/0034040 | A1 | 2/2023 | Luo et al. |

OTHER PUBLICATIONS

J. Galbally, S. Marcel and J. Fierrez, "Biometric Antispoofing Methods: A Survey in Face Recognition," in IEEE Access, vol. 2, pp. 1530-1552, 2014, doi: 10.1109/ACCESS.2014.2381273. (Year: 2014).*

R. F. Nogueira, R. de Alencar Lotufo and R. Campos Machado, "Fingerprint Liveness Detection Using Convolutional Neural Networks," in IEEE Transactions on Information Forensics and Security, vol. 11, No. 6, pp. 1206-1213, Jun. 2016, doi: 10.1109/TIFS.2016.2520880. (Year: 2016).*

Almeida W.R., et al., "Detecting Face Presentation Attacks in Mobile Devices with a Patch-Based CNN and a Sensor Aware Loss Function", PLOS ONE, vol. 15, No. 9, e0238058, 2020, pp. 1-24.

Belli D., et al., "A Personalized Benchmark for Face Anti-Spoofing", in Proceedings of the IEEE/CVF Winter Conference on Applications of Computer Vision, 2022, pp. 338-348.

Deng J., et al., "Imagenet: A Large-Scale Hierarchical Image Database", in 2009 IEEE Conference on Computer Vision and Pattern Recognition, 2009, pp. 248-255.

Fatemifar S., et al., "A Stacking Ensemble for Anomaly Based Client-Specific Face Spoofing Detection", in 2020 IEEE International Conference on Image Processing (ICIP). IEEE, 2020, pp. 1371-1375.

Fatemifar S., et al., "Client-Specific Anomaly Detection for Face Presentation Attack Detection," Pattern Recognition, vol. 112, 107696, 2021, pp. 1-13.

Fatemifar S., et al., "Combining Multiple One-Class Classifiers for Anomaly Based Face Spoofing Attack Detection". in 2019 International Conference on Biometrics (ICB). IEEE, 2019, 8 Pages.

Feng H., et al., "Learning Generalized Spoof Cues for Face Anti-spoofing", arXiv:2005.03922v1 [cs.CV], May 8, 2020, pp. 1-16.

Feng L., et al., "Integration of Image Quality and Motion Cues for Face Anti-Spoofing: A Neural Network Approach", Journal of Visual Communication and Image Representation, vol. 38, 2016, pp. 451-460.

He K., et al., "Deep Residual Learning for Image Recognition", 2016 IEEE Conference on Computer Vision and Pattern Recognition (CVPR), IEEE, Jun. 27, 2016, pp. 770-778, XP033021254.

Jourabloo A., et al., "Face De-Spoofing: Anti-Spoofing via Noise Modeling", in Proceedings of the European Conference on Computer Vision (ECCV), arXiv:1807.09968v1 [cs.CV] Jul. 26, 2018, 17 Pages.

Kim T., et al., "BASN: Enriching Feature Representation Using Bipartite Auxiliary Supervisions for Face Anti-Spoofing," in Proceedings of the IEEE/CVF International Conference on Computer Vision Workshops, 2019, pp. 494-503.

Kingma D.P., et al., "ADAM: A Method for Stochastic Optimization", arXiv:1412.6980v9 [cs.LG], Jan. 30, 2017, International Conference for Learning Representations, 2015, pp. 1-15.

Li H., et al., "Unsupervised Domain Adaptation for Face Anti-Spoofing", IEEE Transactions on Information Forensics and Security, vol. 13, No. 7, 2018, 16 Pages.

Li L., et al., "An Original Face Antispoofing Approach Using Partial Convolutional Neural Network", in 2016 Sixth International Conference on Image Processing Theory, Tools and Applications (IPTA), IEEE, 2016, 6 Pages.

Liu S., et al., "3D Mask Face Anti-Spoofing with Remote Photoplethysmography", in European Conference on Computer Vision. Springer, 2016, pp. 85-100.

Liu S.Q., et al., "Remote photoplethysmography Correspondence Feature for 3D Mask Face Presentation Attack Detection", in Proceedings of the European Conference on Computer Vision (ECCV), 2018, 16 Pages.

Liu Y., et al., "Learning Deep Models for Face Anti-Spoofing: Binary or Auxiliary Supervision", in Proceedings of the IEEE conference on computer vision and pattern recognition, arXiv:1803.11097v1 [cs.CV] Mar. 29, 2018, pp. 389-398.

Lv L., et al., "Combining Dynamic Image and Prediction Ensemble for Cross-Domain Face Anti-Spoofing", in ICASSP 2021-2021 IEEE International Conference on Acoustics, Speech and Signal Processing (ICASSP). IEEE, 2021, pp. 2550-2554.

Quan R., et al., "Progressive Transfer Learning for face Anti-Spoofing", IEEE Transactions on Image Processing, vol. 30, 2021, pp. 3946-3955.

Shao R., et al., "Multi-Adversarial Discriminative Deep Domain Generalization for Face Presentation Attack Detection", in Proceedings of the IEEE/CVF Conference on Computer Vision and Pattern Recognition, 2019, pp. 10023-10031.

Wang J., et al., "Self-Domain Adaptation for Face Anti-Spoofing", in Proceedings of the AAAI Conference on Artificial Intelligence, 2021, vol. 35, pp. 2746-2754.

Xu X., et al., "On Improving Temporal Consistency for Online Face Liveness Detection System", in Proceedings of the IEEE/CVF International Conference on Computer Vision, 2021, pp. 824-833.

Yang J., et al., "Person-Specific Face Anti-Spoofing with Subject Domain Adaptation", IEEE Transactions on Information Forensics and Security, vol. 10, No. 4, 2015, pp. 797-809.

Yang X., et al., "Face Anti-Spoofing: Model Matters, so does Data", in Proceedings of the IEEE/CVF Conference on Computer Vision and Pattern Recognition, 2019, pp. 3507-3516.

Yu Z., et al., "Searching Central Difference Convolutional Networks for Face Antispoofing", in Proceedings of the IEEE/CVF Conference on Computer Vision and Pattern Recognition, 2020, pp. 5294-5304.

Zhang P., et al., "FeatherNets: Convolutional Neural Networks as Light as Feather for Face Anti-Spoofing," in Proceedings of the IEEE/CVF Conference on Computer Vision and Pattern Recognition Workshops, 2019, pp. 1574-1583.

International Search Report and Written Opinion—PCT/US2023/060821—ISA/EPO—May 10, 2023.

* cited by examiner

ADAPTIVE PERSONALIZATION FOR ANTI-SPOOFING PROTECTION IN BIOMETRIC AUTHENTICATION SYSTEMS

CROSS-REFERENCE TO RELATED APPLICATIONS

This application claims priority to and benefit of U.S. Provisional Patent Application Ser. No. 63/267,985, entitled "Adaptive Personalization for Anti-Spoofing Protection in Biometric Authentication Systems," filed Feb. 14, 2022, and assigned to the assignee hereof, the entire contents of which are hereby incorporated by reference.

INTRODUCTION

Aspects of the present disclosure relate to using artificial neural networks to protect against biometric credential spoofing in biometric authentication systems.

In various computing systems, such as on smartphones, tablet computers, or the like, users may authenticate and gain access to these computing systems using various techniques, alone (e.g., single factor authentication) or in combination with each other (e.g., multifactor authentication). One authentication technique involves the use of biometric data to authenticate a user. Biometric data generally includes information derived from the physical characteristics of a user, such as fingerprint data, iris scan data, facial scan data, and the like.

In a biometric authentication system, a user typically enrolls with an authentication service (e.g., executing locally on the device or remotely on a separate computing device) by providing one or more scans of a relevant biometric feature (e.g., body part) to the authentication service that can be used as a reference data source. For example, in a biometric authentication system in which fingerprints are used to authenticate the user, multiple fingerprint scans may be provided to account for differences in the way a user holds a device, to account for differences between different regions of the finger, and to account for different fingers that may be used in authenticating the user. In another example, in a biometric authentication system in which the user's face is used for authentication, multiple images of the user's face may be provided to account for different angles or perspectives that may be used in capturing the image of the user's face for authentication. When a user attempts to access the device, the user may scan or otherwise capture an image of the relevant body part, and the captured image (or representation thereof) may be compared against a reference (e.g., a reference image or representation thereof). If the captured image is a sufficient match to the reference image, access to the device or application may be granted to the user. Otherwise, access to the device or application may be denied, as an insufficient match may indicate that an unauthorized or unknown user is trying to access the device or application.

While biometric authentication systems add additional layers of security to access controlled systems versus passwords or passcodes, techniques exist to circumvent these biometric authentication systems. For example, in fingerprint-based biometric authentication systems, fingerprints can be authenticated based on similarities between ridges and valleys captured in a query image and captured in one or more enrollment images (e.g., through ultrasonic sensors, optical sensors, or the like). In another example, in image-based facial recognition systems, facial recognition may be achieved based on portions of a user's face that can be replicated in other images. Because the general techniques by which these biometric authentication systems authenticate users is known, it may be possible to attack these authentication systems and gain unauthorized access to protected resources using a reproduction of a user's biometric data. These types of attacks may be referred to as "spoofing" attacks.

BRIEF SUMMARY

Certain aspects provide a method for biometric authentication using an anti-spoofing protection model refined using online data. The method generally includes receiving a biometric data input for a user. Features for the received biometric data input are extracted through a first machine learning model. It is determined, using the extracted features for the received biometric data input and a second machine learning model, whether the received biometric data input for the user is authentic or inauthentic. It is determined whether to add the extracted features for the received biometric data input, labeled with an indication of whether the received biometric data input is authentic or inauthentic, to a finetuning data set. The second machine learning model is adjusted based on the finetuning data set.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods, as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide techniques for anti-spoofing protection for biometric authentication systems and methods.

In many biometric security systems, images (or samples) are captured of a biometric characteristic of a user (e.g., a fingerprint image obtained from an image scan or an ultrasonic sensor configured to generate an image based on reflections from ridges and valleys in a fingerprint, a face structure derived from a facial scan, an iris structure derived from an iris scan, etc.) for use in authenticating the user. The acceptable degree of similarity between a captured image and a reference image may be tailored to meet false acceptance rate (FAR) and false rejection rate (FRR) metrics. The FAR may represent a rate at which a biometric security system incorrectly allows access to a system or application (e.g., to a user other than the user(s) associated with reference image(s) in the biometric security system), and the FRR may represent a rate at which a biometric security system incorrectly blocks access to a system or application. Generally, a false acceptance may constitute a security breach, while a false rejection may be an annoyance (e.g., by delaying access to the system). Because biometric security systems are frequently used to allow or disallow access to potentially sensitive information or systems, and because false acceptances are generally dangerous, biometric security systems may typically be configured to minimize the FAR to as close to zero as possible, usually with the tradeoff of an increased FRR.

In some cases, biometric security systems may be fooled (or "spoofed") into accepting spoofed biometric credentials, which may allow for unauthorized access to protected resources and other security breaches within a computing system. For example, in some fingerprint authentication systems, a fake finger created with a fingerprint lifted from another location can be used to gain unauthorized access to a protected computing resource. These fake fingers may be easily created, for example, using three-dimensional printing or other additive manufacturing processes, gelatin molding, or other processes. In other cases, images or models of a user's face can be used to gain unauthorized access to a protected computing resource protected by a facial recognition system. Because fake biometric data sources may be easily created, biometric authentication systems generally include anti-spoofing protection systems that attempt to distinguish between biometric data from real or fake sources.

Example Biometric Data Authentication Pipeline

Figure 1:
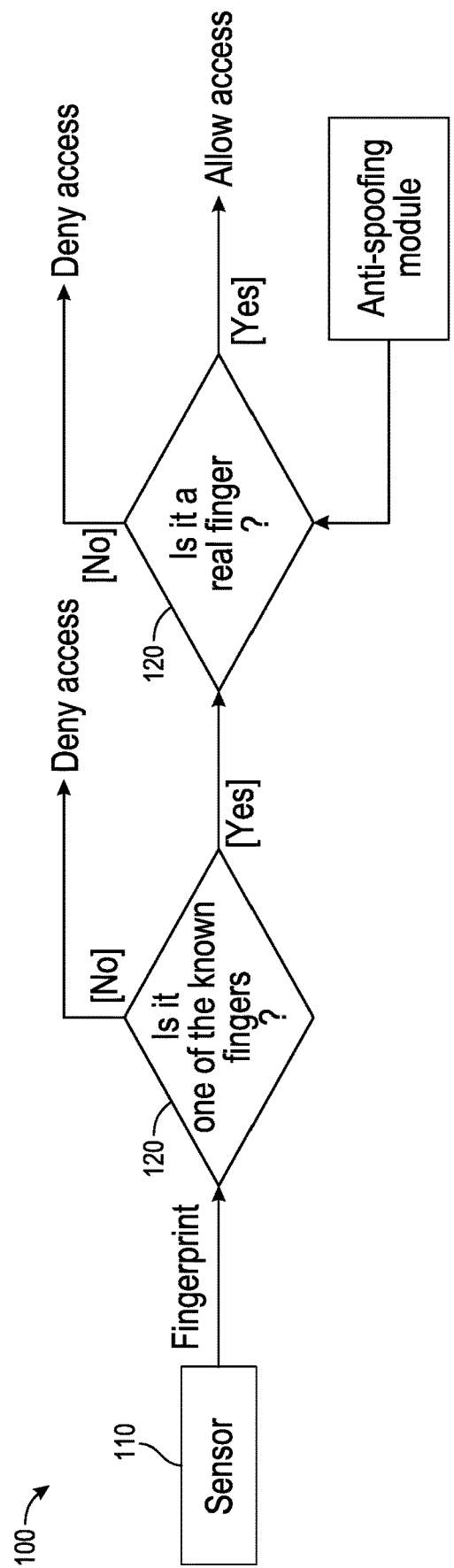
FIG. 1 depicts an example biometric authentication pipeline.

FIG. 1 illustrates an example biometric authentication pipeline 100, in accordance with certain aspects of the present disclosure. While the biometric authentication pipeline 100 is illustrated as a fingerprint authentication pipeline, it should be recognized that the biometric authentication pipeline 100 may be also or alternatively used in capturing and authenticating other biometric data, such as facial scans, iris scans, and other types of biometric data. Likewise, various aspects refer to capturing images (e.g., by a sensor), but it should be recognized that other types of samples (in addition to or alternative of images) may be captured for authentication.

As illustrated, biometric data, such as (but not limited to) an image (or sample) of a fingerprint, is captured by a sensor 110 and provided to a comparator 120, which determines whether the biometric data captured by the sensor 110 corresponds to one of a plurality of known sets of biometric data (e.g., whether a captured image of a fingerprint corresponds to a known fingerprint). The sensor 110 may be, for example, an imaging sensor, a scanner, an ultrasonic sensor, or other sensor which can generate image data from a scan of a user biometric. To determine whether biometric data captured by the sensor 110 corresponds to one of a plurality of known sets of biometric data, the comparator 120 can compare the captured biometric data (or features derived from) to samples in an enrollment sample set (or features derived therefrom) captured when a user enrolls one or more biometric data sources (e.g., fingers) for use in authenticating the user. Generally, the enrollment image set includes a plurality of images for each biometric data source enrolled in a fingerprint authentication system. For security purposes, however, the actual enrollment images may be stored in a secured region in memory (not shown), or a representation of the enrollment images may be stored in lieu of the actual enrollment images to protect against extraction and malicious use of the enrollment images.

Generally, the comparator 120 can identify unique physical features within captured biometric data and attempt to match these unique physical features to similar physical features in one of the enrollment samples (e.g., an enrollment image). For example, in a fingerprint authentication system the comparator 120 can identify patterns of ridges and valleys in a fingerprint and/or fingerprint minutiae such as ridge/valley bifurcations or terminations to attempt to match the captured fingerprint to an enrollment image. In some cases, the comparator 120 may apply various transformations to the captured biometric data to attempt to align features in the captured biometric data with similar features in one or more of the images in the enrollment image set. These transformations may include, for example, applying rotational transformations to (i.e., rotating) the captured biometric data, laterally shifting (i.e., translating) the captured biometric data, scaling the captured biometric data to a defined resolution, combining the captured biometric data with one or more of the enrollment images in the enrollment image set to create a composite image, or the like. If the comparator 120 determines that the captured biometric data does not match any of the images in the enrollment image set, the comparator 120 can determine that the captured biometric data is not from an enrolled user and can deny access to protected computing resources.

Otherwise, if the comparator 120 determines that the captured biometric data does match at least one of the images in the enrollment image set, an anti-spoofing protection engine 130 can determine whether the captured biometric data is from a real source or a fake source. If the anti-spoofing protection engine 130 determines that the captured biometric data is from a real source, the anti-spoofing protection engine 130 can allow access to the protected computing resources; otherwise, anti-spoofing protection engine 130 can deny allow access to the protected computing resources. Various techniques may be used to determine whether the captured biometric data is from a real source or a fake source. For example, in a fingerprint authentication system, surface conductivity can be used to determine whether the fingerprint image is from a real finger or a fake finger. Because human skin has certain known conductivity characteristics, images captured from sources that do not have these conductivity characteristics may be determined to have been sourced from a fake finger. However, because these techniques are typically performed without reference to the enrollment image set and/or the captured fingerprint image, anti-spoofing protection systems may be defeated through the use of various materials or other technical means that replicate the known anatomical properties of a real biometric data source that could otherwise be used to prevent against spoofing attacks.

While FIG. 1 illustrates a biometric authentication pipeline in which a comparison is performed prior to determining whether the captured biometric data (e.g., captured image of a fingerprint) is from a real source or a fake source, it should be recognized by one of ordinary skill in the art that these operations may be performed in any order or concurrently. That is, within a biometric authentication pipeline, the anti-spoofing protection engine 130 can determine whether captured biometric data is from a real source or a fake source prior to the comparator 120 determining whether a match exists between the biometric data captured by the sensor 110 and one or more images in an enrollment image set.

Figure 2:
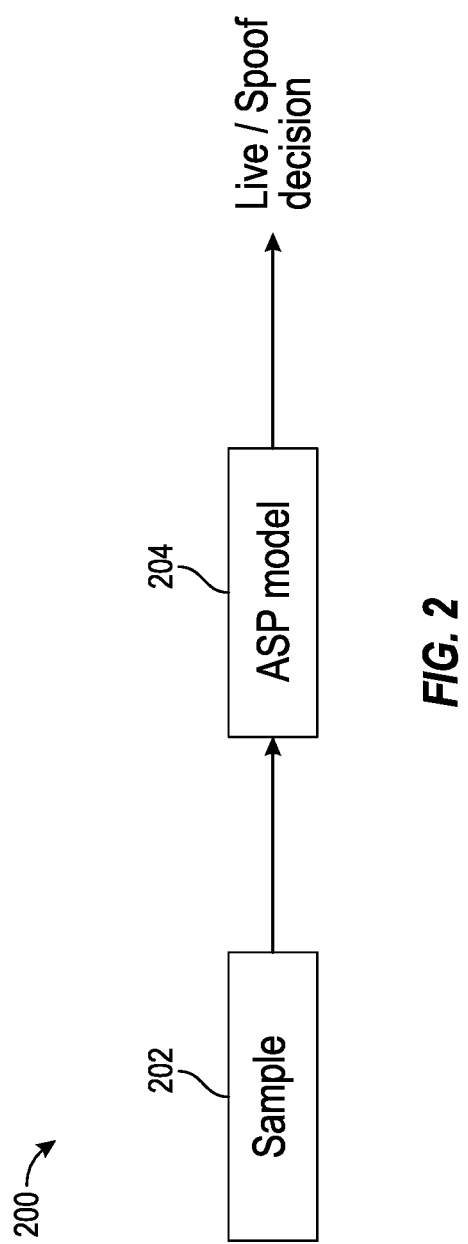
FIG. 2 illustrates an example anti-spoofing protection system in a biometric authentication pipeline.

Example Anti-Spoofing Protection Systems in a Fingerprint Authentication Pipeline FIG. 2 illustrates an example anti-spoofing protection system 200 in a biometric authentication pipeline, such as (but not limited to) a fingerprint authentication pipeline.

In the anti-spoofing protection system 200, a sample 202 captured by a sensor (e.g., an ultrasonic sensor, an optical sensor, etc.) may be provided as input into an anti-spoofing protection model 204. The anti-spoofing protection model 204 may be trained generically based on a predefined training data set to determine whether the captured sample 202 is from a real finger or a fake finger (e.g., to make a live or spoof decision which may be used in a fingerprint authentication pipeline to determine whether to grant a user access to protected computing resources). The anti-spoofing protection model 204, however, may be relatively inaccurate, as the training data set used to train the anti-spoofing protection model 204 may not account for natural variation between users that may change the characteristics of the sample 202 captured for different users. For example, users may have varying skin characteristics that may affect the data captured in the sample 202, such as dry skin, oily skin, or the like. Users with dry skin may, for example, cause generation of the sample 202 with less visual acuity than users with oily skin. Additionally, the anti-spoofing protection model 204 may not account for differences between the sensors and/or surface coverings for a sensor used to capture the sample 202. For example, sensors may have different levels of acuity or may be disposed underneath cover glass of differing thicknesses, refractivity, or other properties which may change (or distort) the captured sample 202 relative to other sensors used to capture other samples. Further, different instances of the same model of sensor may have different characteristics due to manufacturing variability (e.g., in alignment, sensor thickness, glass cover thickness, etc.) and calibration differences resulting therefrom.

Still further, some users may cover the sensor used to capture the sample 202 with a protective film or otherwise obstruct the sensor (e.g., from smudges, dirt, etc.) that can impact the image captured by the sensor.

Generally, anti-spoofing protection models determine whether a query is from a real or fake biometric data source independently on a per-query basis. These anti-spoofing protection models may not consider contextual information, such as (but not limited to) information about the current user, information about the device, a history of attempts to access protected computing resources using biometric authentication, and/or the like. Thus, anti-spoofing protection models may not learn from previous misclassifications of biometric authentication attempts, even though in real-life deployments, biometric data samples generally have temporal correlations that can be used to inform predictions of whether the biometric data captured for use in an attempt to access protected computing resources is from a real source or a fake source.

For example, it may be observed that consecutive samples, especially those that are temporally close to each other, tend to be similar. That is, for a set of n consecutive samples, it is likely that the conditions under which these samples are captured are similar. Thus, in the anti-spoofing context, it is likely that each of these n samples are all from a real source or all from a fake source. Similarly, with respect to the fidelity of the captured biometric data, it is likely that conditions at the sensor that captured the biometric data and the biometric data source itself have remained the same or similar. Because past information may have some correlation with current information used by a biometric authentication system and an anti-spoofing protection model, aspects of the present disclosure leverage this correlation to improve the accuracy of an anti-spoofing protection model and customize the anti-spoofing protection model for a specific device and user.

Figure 3:
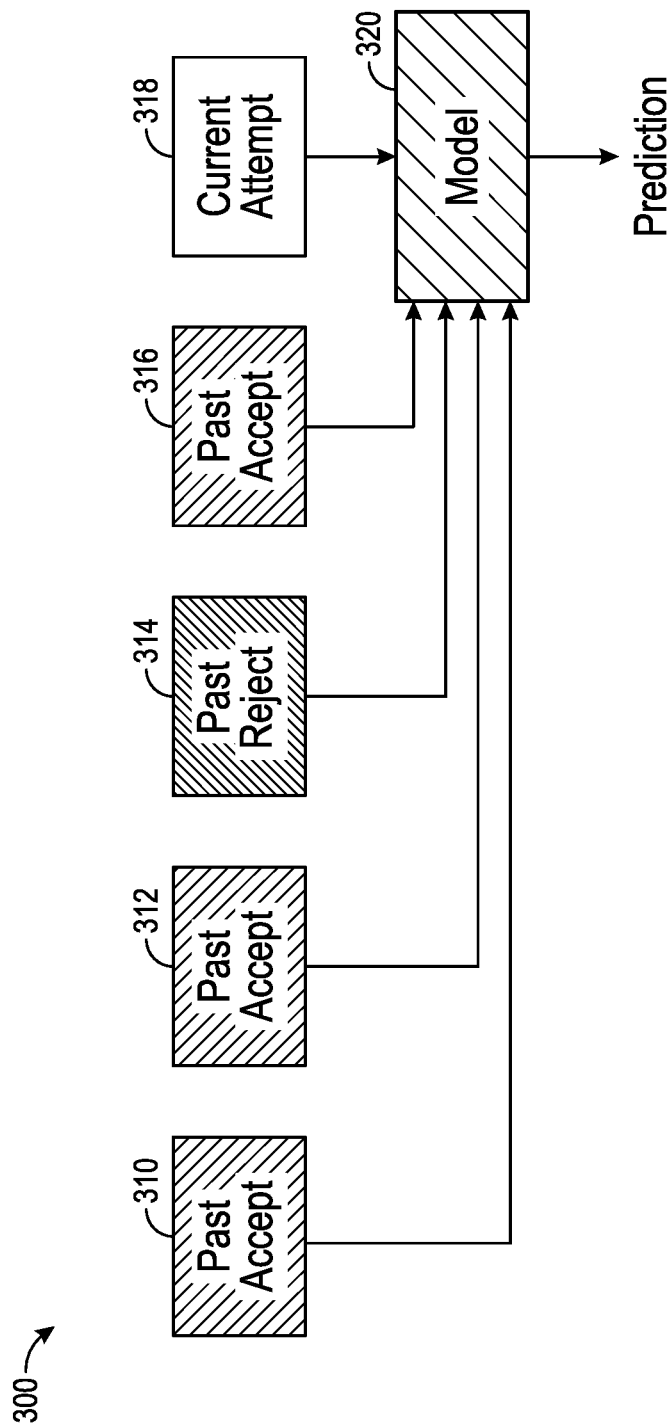
FIG. 3 illustrates the use of current and historical biometric authentication data inputs in a biometric authentication pipeline, according to aspects of the present disclosure.

FIG. 3 illustrates the use of current and historical biometric authentication data inputs in a biometric authentication pipeline, according to aspects of the present disclosure.

In this example, historical authentication attempts 310, 312, 314, and 316, as well as a current attempt 318, may be input into an anti-spoofing protection model 320. One or more of the historical authentication attempts 310, 312, 314, and 316 may include historical information that may have some correlation to the current attempt 318. For example, if the historical authentication attempts 310, 312, 314, and 316 are temporally close to the current attempt 318, the conditions at the sensor(s) used to capture the biometric data and conditions of the biometric data source (e.g., dry skin, oily skin, etc.) may be assumed to be similar across the historical authentication attempts 310, 312, 314, and 316, as well as the current attempt 318. Further, it may be assumed that the same biometric data source is used in each of the historical authentication attempts 310, 312, 314, and 316, as well as the current attempt 318. Thus, the anti-spoofing protection model 320 can generate predictions with improved accuracy by considering similarities between the data used in historical authentication attempts and current authentication attempts.

In various aspects, these assumptions may be context-specific. For example, these assumptions may hold for biometric authentication on a mobile device used by a single user but may not hold for a public biometric scanner that captures diverse biometric data from multiple biometric data sources over a short period of time.

Figure 4:
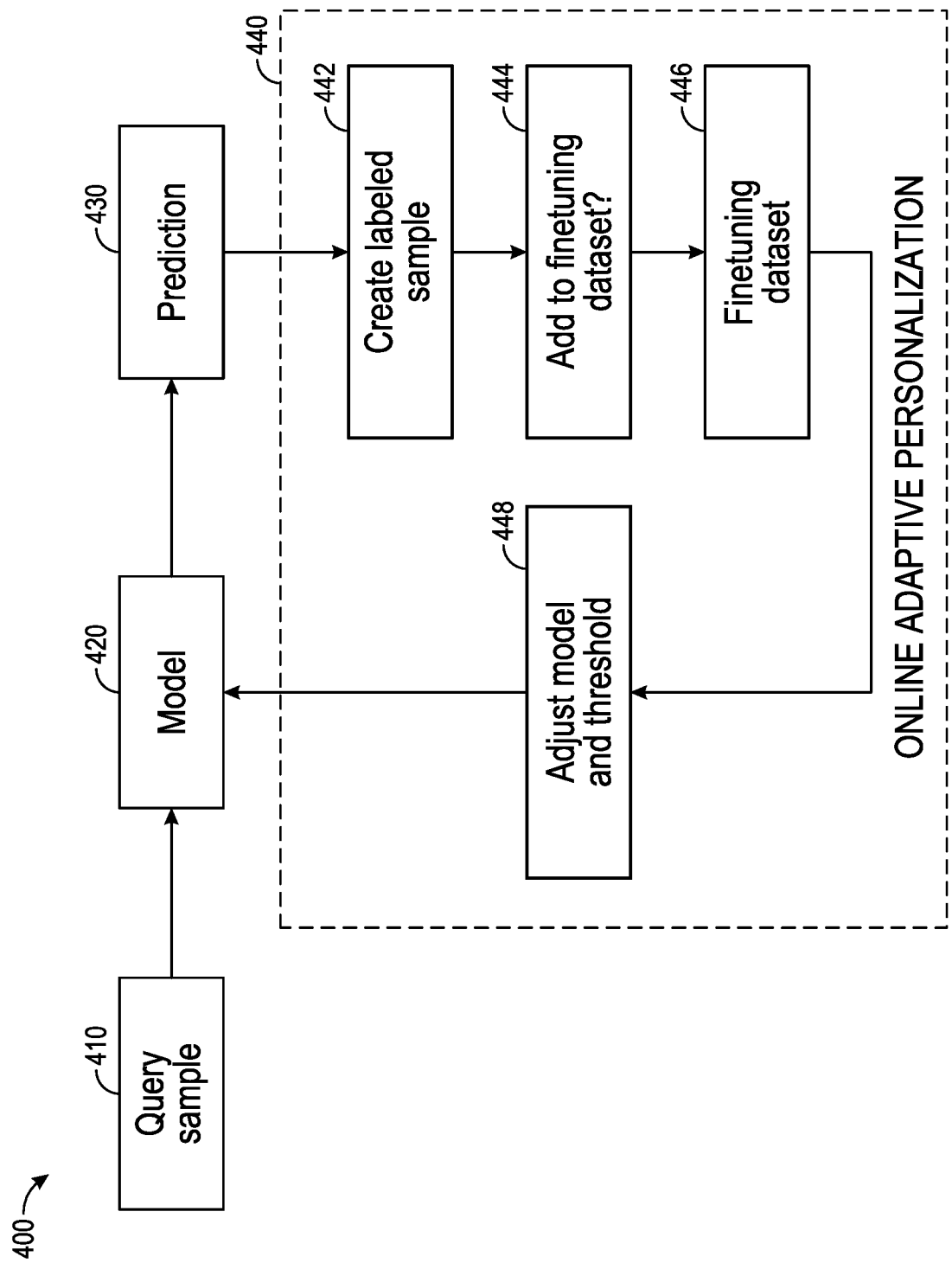
FIG. 4 illustrates a biometric authentication system with anti-spoofing protection based on online adaptive personalization, according to aspects of the present disclosure.

Example Online Adaptive Personalization of Anti-Spoofing Protection Models in Biometric Authentication Systems Further improvements in the accuracy of anti-spoofing protection models may be achieved through on-device (or online) adaptive personalization of such models, as illustrated in FIG. 4.

FIG. 4 illustrates an anti-spoofing protection pipeline 400. In the anti-spoofing protection pipeline 400, a sample 410 captured by a biometric data capture device (e.g., an ultrasonic sensor, an optical sensor, a camera, etc.) may be provided as input into an anti-spoofing protection model 420. This anti-spoofing protection model 420 may be trained generically based on a predefined training data set to determine whether the captured sample 410 is from a real source or a fake source. For example, in a fingerprint authentication system, the anti-spoofing protection model 420 can make a decision of whether the source of the sample 410 is a live source (e.g., the user's finger) or a spoof source (e.g., a replica of the user's finger). A prediction 430 generated by the anti-spoofing protection model 420 may subsequently be used to determine whether to grant the user access to protected computing resources. Generally, when the prediction 430 indicates that the source of the sample 410 is likely a live source, a biometric authentication system can grant access to protected computing resources if the sample 410 matches an enrolled sample. In contrast, when the prediction 430 indicates that the source of the sample 410 is likely a spoof, or inauthentic, source, a biometric authentication system can block access to protected computing resources, regardless of whether the sample 410 matches an enrolled sample.

The anti-spoofing protection model 420 may include a first model that extracts features from the captured sample 410 and a second model that generates the prediction 430 from the features extracted from the sample 410. The first model may include, for example, convolutional neural networks (CNNs), transformer neural networks, recurrent neural networks (RNNs), or any of various other suitable artificial neural networks or other machine learning models that can be used to extract features from a sample or a representation thereof. The second model may include various probabilistic or predictive models that can predict whether the sample 410 is from an authentic biometric data source or from an inauthentic (biometric data) source.

To personalize the anti-spoofing protection model 420, an online adaptive personalization module 440 can use the prediction 430 generated by the anti-spoofing protection model 420 for the sample 410 to generate a finetuning data set $\mathcal{D}$ for adjusting (e.g., retraining) the anti-spoofing protection model 420. In some aspects, the finetuning data set $\mathcal{D}$ may be initialized as the null set, and samples may be added to the finetuning data set $\mathcal{D}$ as discussed in further detail below.

In some aspects, the prediction 430 may be a predictive score or other score between a defined lower bound value and a defined upper bound value. The lower bound value may be associated with a classification of a sample as one obtained from an inauthentic source, and the upper bound value may be associated with a classification of a sample as one obtained from an authentic source. Values above a threshold level may be associated with the authentic source classification, and at a labeling stage 442, the sample 410 may be labeled with an indication that the sample 410 is from an authentic source. Meanwhile, values below the threshold level may be associated with the inauthentic source classification, and at the labeling stage 442, the sample 410 may be labeled with an indication that the sample 410 is from an inauthentic source (e.g., a replica of the user's finger, images or three-dimensional models of the user's face, etc.). In other aspects, only one of the authentic samples or inauthentic sources may be labeled as such.

At a finetuning data set generation stage 444, it may be determined whether to add the labeled sample generated at the labeling stage 442 to a finetuning data set 446 for use in retraining and refining the anti-spoofing protection model 420. In some aspects, each captured sample may be added to the finetuning data set 446 for use in retraining and refining the anti-spoofing protection model 420. However, adding each captured sample to the finetuning data set 446 may result in the introduction of samples into the finetuning data set 446 for which the classification may be inaccurate or uncertain. For example, assuming a range of predictive scores between 0 and 1, adding samples into the finetuning data set 446 with scores near the middle (e.g., within a threshold range from 0.5) may result in adding samples into the finetuning data set 446 with labels (or classifications) that may actually be somewhat uncertain, and thus, retraining and refining the anti-spoofing protection model 420 based on such data may have a negative impact on the accuracy of predictions made by the anti-spoofing protection model 420.

Thus, in some aspects, the finetuning data set generation stage 444 can ensure that the finetuning data set 446 includes data for which the classification can be relied upon with some degree of confidence. To do so, the predictions 430 may be compared to at least one threshold score, such as a first threshold score and a second threshold score. The first threshold score may be, for example, a maximum score for samples classified as samples from inauthentic sources, and the second threshold score may be a minimum score for samples classified as samples from real sources. If, as illustrated in example 610 in FIG. 6 and discussed in further detail below, the prediction 430 is below the first threshold score or above the second threshold score, the labeled sample 410 may be added to the finetuning data set 446. Otherwise, if the prediction 430 is between the first threshold score and the second threshold score, the prediction 430 may be considered sufficiently uncertain such that the sample 410 may not be a good sample to add to the finetuning data set 446.

In some aspects, the finetuning data set generation stage 444 can use smoothing techniques to improve the consistency of the labels associated with the samples in the finetuning data set 446. For instance, the smoothing techniques can be implemented within a sliding time window (e.g., as discussed in further detail below with respect to FIG. 7). For example, over a sliding time window of duration W, a label $\hat{l}_t$ for a sample at time t may be applied according to the equation:

$$\hat{l}_t = 1 \text{ if } \left( \frac{1}{W} \sum_{i \in [t - \frac{W}{2}; t + \frac{W}{2}]} \hat{l}_i \right) > 0.5 \text{ else } 0$$

where i represents the $i^{th}$ sample within a time window centered on time t. The duration of W may be selected such that the anti-spoofing protection model 420 can respond to quick transitions between authentic access attempts and spoofing attacks.

At a model adjusting stage 448, the anti-spoofing protection model 420 may be retrained and refined based on the finetuning data set 446. In some aspects, the anti-spoofing protection model 420 may be retrained and refined periodically (e.g., after m samples are added to the finetuning data set, after some defined amount of time, upon a system reboot, after running one or more applications some defined number of times, etc.).

In some aspects, where the anti-spoofing protection model 420 is a deep learning model (e.g., a deep neural network or other neural network), the retraining and refining of the anti-spoofing protection model 420 may, in some aspects, be executed as a number of iterations of a mini-batch gradient descent seeing to optimize cross-entropy as an objective function, where the mini-batches comprise data sampled from the finetuning data set 446. The cross-entropy loss optimized during execution of the mini-batch gradient descent may be represented by the equation:

$$L_{CE}(\hat{l}_i, y_i) = \hat{l}_i \cdot \log y_i + (1 - \hat{l}_i) \cdot \log(1 - y_i)$$

where $y_i$ corresponds to the predictions generated by the anti-spoofing protection model 420 and $\hat{l}_i$ corresponds to a label assigned to sample i in the finetuning data set 446. Other updating techniques may be used in cases, based on the type of the anti-spoofing protection model 420 (e.g., whether the anti-spoofing protection model 420 is a support vector machine, random tree, etc.).

In some aspects, as discussed in further detail below, the anti-spoofing protection model 420 may be retrained by weighting data in the finetuning data set 446 differently, for instance, based on various properties of each sample in the finetuning data set 446.

For example, where the finetuning data set 446 includes a pretraining data set of data from different known subjects, sensors, and/or types of inauthentic biometric data sources used in spoofing attacks, and a set of samples captured during operation of a biometric authentication system (also referred to as "online data"), different weights may be applied to the pretraining data set and the set of online data. For example, over time, weights applied to the pretraining data set may decrease, and weights applied to the set of online data may increase to increasingly tailor the resulting model to the properties of the biometric sensors on the device itself and the properties of the users who use the biometric authentication system to gain access to protected computing resources. The use of a pretraining data set and a set of online data may be used to prevent overfitting problems that may result from retraining and refining the anti-spoofing protection model 420 based on an unbalanced set of online data that may, probabilistically, include significantly more data from authentic biometric sources than inauthentic biometric sources.

In another example, the set of online data may be weighted temporally. Generally, older samples in the set of online data may be considered to be less relevant to the user than newer samples in the set of online data, as it may be assumed that the conditions under which the older samples were captured may be different from the conditions under which the new samples were captured and thus may not represent the current conditions of the sensor(s) used to capture biometric data or the sources of the biometric data. Thus, the newest samples in the set of online data may be assumed to have properties that are the most similar to incoming samples used in biometric authentication than older samples. Older samples may, for example, be progressively assigned lower weights to de-emphasize these older samples in retraining and refining the anti-spoofing protection model 420 at the model adjusting stage 448.

In some aspects, a threshold age may be established for weighting samples (or pruning such) in the finetuning data set 446. Samples of online data that are older than the threshold age may be assigned a zero weight (or otherwise pruned) at the model adjusting stage 448, which may effectively remove these samples from consideration in retraining and refining the anti-spoofing protection model 420. Samples that are newer than the threshold age may be considered in retraining and refining the anti-spoofing protection model 420, and in some aspects, may be differentially weighted such that the newest samples are assigned a highest weight and the oldest samples that are still newer than the threshold age are assigned a lowest weight at the model adjusting stage 448.

In some aspects, the data in the finetuning data set 446 may be an unbalanced data set including a significantly greater number of authentic biometric data inputs than inauthentic biometric data inputs. To avoid a situation where an unrepresentative data set is used to adjust the anti-spoofing protection model 420, the samples in the finetuning data set 446 selected for adjusting the anti-spoofing protection model 420 may mirror the distribution of authentic and inauthentic biometric data inputs identified in real-life deployment of the anti-spoofing protection model 420.

In some aspects, various techniques may be used to regularize the anti-spoofing protection model 420 and avoid a situation in which the anti-spoofing protection model 420 overfits to the finetuning data set 446 (e.g., where the anti-spoofing protection model 420 fits to the finetuning data set 446 but provides poor inference accuracy on data outside of the finetuning data set 446). To do so, the anti-spoofing protection model 420 may be reset periodically to an initial state. For example, the weights in the anti-spoofing protection model may be reset to the weights established when the anti-spoofing protection model was initially trained based on a pretraining data set of data from different known subjects, sensors, and/or types of inauthentic biometric data sources used in spoofing attacks. In another example, parameter updates may be constrained by a restricted learning rate or through the use of various optimization constraints. Still further, at the model adjusting stage 448, only portions of the anti-spoofing protection model may be updated.

In some aspects, the anti-spoofing protection model 420 may be represented as a feature extractor $\phi_f$ that extracts features from an incoming sample 410 and a classifier $\phi_c$ that generates a prediction 430. The features $f_t$ for the $t^{th}$ sample x may be represented by the equation $f_t = \phi_f(x_t)$, and the classification y of the sample x may be represented by the equation $y_t = \phi_c(f_t) = \phi_c(\phi_f(x_t))$. $f_t$ may be a low-dimensional latent representation of the input sample $x_t$ (e.g., the sample 410). During the model adjusting stage 448, in some aspects, $\phi_f$ may remain static, and $\phi_c$ may be retrained based on the finetuning data set 446. Because $\phi_c$ may represent only a portion of a neural network (e.g., the final layers of a neural network), retraining and refining $\phi_c$ may be a computationally inexpensive process relative to training the entirety of the anti-spoofing protection model 420. Further, because the data in the finetuning data set 446 may include the extracted features $f_t$ for a given input $x_t$, and not input $x_t$ itself, the size of the finetuning data set 446 may be minimized, and the privacy of sensitive input data that could be used to generate data sources for spoofing attacks may be maintained.

Figure 5:
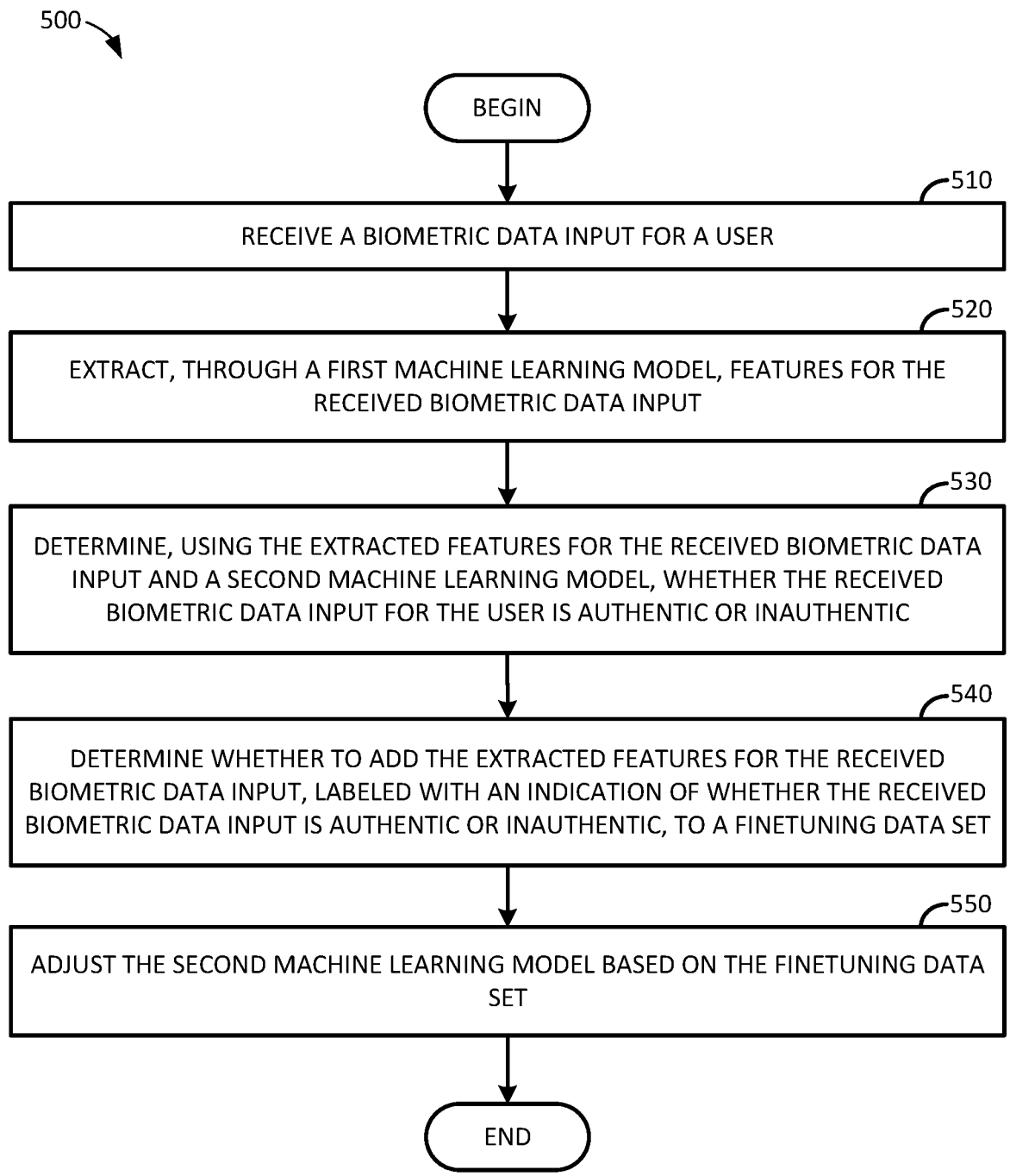
FIG. 5 illustrates example operations for authenticating biometric data and adjusting an anti-spoofing protection model for biometric authentication based on a finetuning data set generated from captured biometric data, according to aspects of the present disclosure.

Example Methods for Online Adaptive Personalization of Anti-Spoofing Protection Models in Biometric Authentication Systems FIG. 5 illustrates example operations 500 that may be performed for authenticating biometric data and adjusting an anti-spoofing protection model for biometric authentication based on a finetuning data set generated from captured biometric data (e.g., as illustrated in FIG. 4 and described above), according to certain aspects of the present disclosure.

As illustrated, the operations 500 begin at block 510, where a biometric data input (e.g., a sample 410 illustrated in FIG. 4) is received for a user in order to authenticate the user. The biometric data input may include (but is not limited to), for example, an image of a fingerprint, an image of the user's face, an image of the user's iris, or the like. In some aspects, the biometric data input may include two-dimensional data or three-dimensional data (e.g., with depth) characterizing the biometric data source to be used in authenticating the user and controlling access to protected computing resources. In some aspects, the received image may be an image in a binary color space in which a first color represents a surface and a second color represents transitions between different surfaces. For example, a first color may represent valleys in a fingerprint, and a second color may represent transitions from valleys to ridges in the fingerprint. In some aspects, the received image may be an image in a low-bit-depth monochrome color space in which a first color represents a first type of characteristic in a biometric data input, a second color represents a second type of characteristic in the biometric data input, and colors between the first color and second color represent transitions between the first and second types of characteristics. In still further examples, biometric data inputs may include other data that can be used in determining whether a biometric data is from an authentic or inauthentic source. The biometric data input may include (but is not limited to) video, thermal data, depth maps, and/or other information that can be used to authenticate a user and determine whether the biometric data input for a user is from an authentic or inauthentic source.

At block 520, features for the received biometric data input are extracted through a first machine learning model. The first machine learning model may include, for example, convolutional neural networks (CNNs), transformer neural networks, recurrent neural networks (RNNs), or any of various other suitable artificial neural networks or other machine learning models that can be used to extract features from an image or a representation thereof. Features may be extracted for the received image and for images in an enrollment image set using neural networks using different weights or using the same weights. In some aspects, features may be extracted for the images in the enrollment image set a priori (e.g., when a user enrolls a biometric data source, such as a finger, a face, or an iris, for use in biometric authentication). In other aspects, features may be extracted for the images in the enrollment image set based on a non-image representation of the images in the enrollment image set when a user attempts to authenticate through a biometric authentication pipeline.

At block 530, it is determined, using the extracted features for the received biometric data input and a second machine learning model, whether the received biometric data input for the user is authentic or inauthentic (e.g., is an input sourced from a real finger, face, iris, etc. or an input sourced from a reproduction of a finger, face, iris, etc.). The determination may be based, for example, on a predictive score generated by the second machine learning model, such as a prediction 430 generated by the anti-spoofing protection model 420 illustrated in FIG. 4. In some aspects, an inauthentic input may also include synthesized images of biometric data sources captured from different data sources and/or a synthetically generated and refined biometric data input, or a biometric data input (e.g., from a collection of fingerprints) designed to match many users of a biometric authentication system. In some aspects, the system can determine whether the received biometric data input of the user is authentic or inauthentic using various types of neural networks that can use various features extracted from the biometric data input and other contextual information to determine whether the received biometric data input is authentic or inauthentic. Generally, the determination may be made based on a predictive score or other score generated by the second machine learning model. If the predictive score or other score exceeds a threshold value, the received biometric data input may be deemed to be authentic. Otherwise, the received data input may be deemed to be inauthentic.

In some aspects, the extracted features for the received biometric data input may include features from (but not limited to) video, thermal data, depth maps, or other information that can be used in determining whether the received biometric data input is from an authentic or inauthentic source. For example, extracted features from a video input may indicate a degree or amount of motion in the biometric data input. A degree of subject motion across frames in the received biometric data input may be a data point that indicates that the biometric data input is from an authentic source, while a lack of subject motion across frames in the received biometric data input may be a data point that indicates that the biometric data input is from an authentic source. In another example, extracted features from the received biometric data input may correspond to captured thermal data for the biometric data source, with certain ranges of temperatures corresponding to biometric data sources that are more likely to be authentic and other ranges of temperatures corresponding to biometric data sources that are less likely to be authentic. In still another aspect, where the received biometric data input includes data from a depth map, the extracted features for depth data from a depth map may be used in determining whether the received biometric data input is authentic or inauthentic based on an assumption that depth data significantly different from the depth data included in data in an enrollment data set may correspond to a biometric data input received from an inauthentic source.

At block 540, it is determined whether to add the extracted features for the received biometric data input (which in some aspects may be labeled with an indication of whether the received biometric data input is authentic or inauthentic) to a finetuning data set (e.g., the finetuning data set 446 illustrated in FIG. 4). In some aspects, the biometric data input may be added to the finetuning data set regardless of the predictive score or other score generated for the biometric data input. In some aspects (e.g., such as in an example 610 illustrated in FIG. 6 and described below) the biometric data input may be added to the finetuning data set if the predictive score for the biometric data input is deemed to be sufficiently strong enough to have a high degree of confidence in the received biometric data input being labeled as authentic or inauthentic. A first threshold score (e.g., a first threshold 612 illustrated in FIG. 6), corresponding to a maximum predictive score for inauthentic biometric inputs, and a second threshold score, corresponding to a minimum predictive score (e.g., a second threshold 614 illustrated in FIG. 6) for authentic biometric inputs, may be established. If the predictive score for the received biometric data input is less than the first threshold score or greater than the second threshold score, the received biometric data input may be added to the finetuning data set. Otherwise, the prediction for the received biometric data input may be considered to not have sufficient strength to justify adding the received biometric data input to the finetuning data set.

At block 550, the second machine learning model is adjusted based on the finetuning data set. As discussed, adjusting the machine learning model may include retraining one or more layers in a neural network based on the finetuning data set with data from the finetuning data set that is weighted to prevent overfitting and to weigh recent biometric data inputs more heavily than older biometric data inputs. The adjusted model may be subsequently used in future predictions of whether a received biometric data input is authentic or inauthentic.

Figure 6:
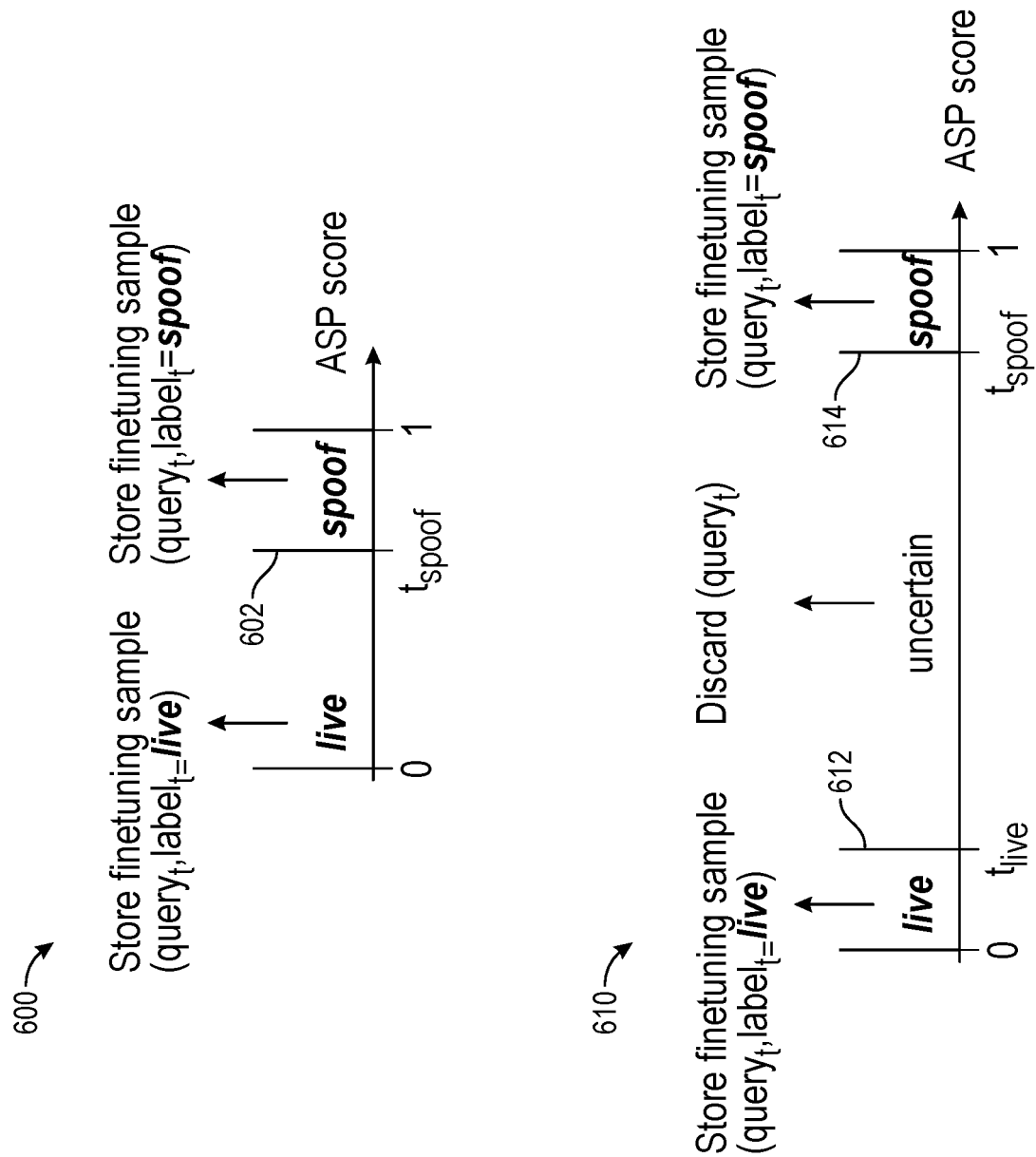
FIG. 6 illustrates example thresholding techniques for adding captured biometric data to a finetuning data set for adjusting an anti-spoofing protection model, according to aspects of the present disclosure.

Example Generation and Weighting of Finetuning Data Sets for Adjusting Anti-Spoofing Protection Models FIG. 6 illustrates example thresholding techniques for adding captured biometric data to a finetuning data set for adjusting an anti-spoofing protection model, according to aspects of the present disclosure. These threshold techniques may be used, for example, to generate the finetuning data set 446 illustrated in FIG. 4 as discussed above with respect to block 540 illustrated in FIG. 5.

As illustrated in the example 600, a single threshold value ($t_{spoof}$) 602 may be established for determining whether a received biometric data input corresponds to an input from an authentic (or live) source or an input from an inauthentic (or spoof) source. As illustrated, if the predictive score generated by the anti-spoofing protection model is less than the single threshold value $t_{spoof}$ 602, the received biometric data input may be labeled with an authentic label and added to the finetuning data set. Otherwise, the predictive score generated by the anti-spoofing protection model is greater than the single threshold value $t_{spoof}$ 602, and thus, the received biometric data input may be labeled with an inauthentic label and added to the finetuning data set.

As discussed above, adding each received biometric data input to the finetuning data set, regardless of the strength of the predictive score associated with each received biometric data input, may result in a finetuning data set that includes samples for biometric data inputs where there may be a low degree of confidence in the accuracy of the labels associated with these samples. To improve the quality of data in the finetuning data set, as illustrated in the example 610, two threshold values 612, 614 may be established for determining whether to add a received biometric data input to the finetuning data set. The threshold value 612 ($t_{live}$) may be, for example, a maximum predictive score for received biometric data inputs classified as authentic inputs that can be added to the finetuning data set, and the threshold value 614 ($t_{spoof}$) may be a minimum predictive score for received biometric data inputs classified as inauthentic inputs that can be added to the finetuning data set. If a received biometric data input has a score between the threshold value 612 and the threshold value 614, confidence that the received biometric data input is classified correctly may be insufficient to justify the addition of the received biometric data input into the finetuning data set.

In some aspects, the threshold values 602, 612, and 614 may be optimized on a calibration data set according to a target false positive rate and a target false negative rate. To do so, an anti-spoofing protection model, such as the anti-spoofing protection model 420 illustrated in FIG. 4, may be trained using biometric data inputs with scores according to a first set of threshold values. If the anti-spoofing protection model generates false positive rates or false negative rates in excess of a target false positive rate or false negative rate, the thresholds may be adjusted to include biometric data inputs with stronger predictive scores indicating a greater likelihood of those biometric data inputs being authentic or inauthentic.

Figure 7:
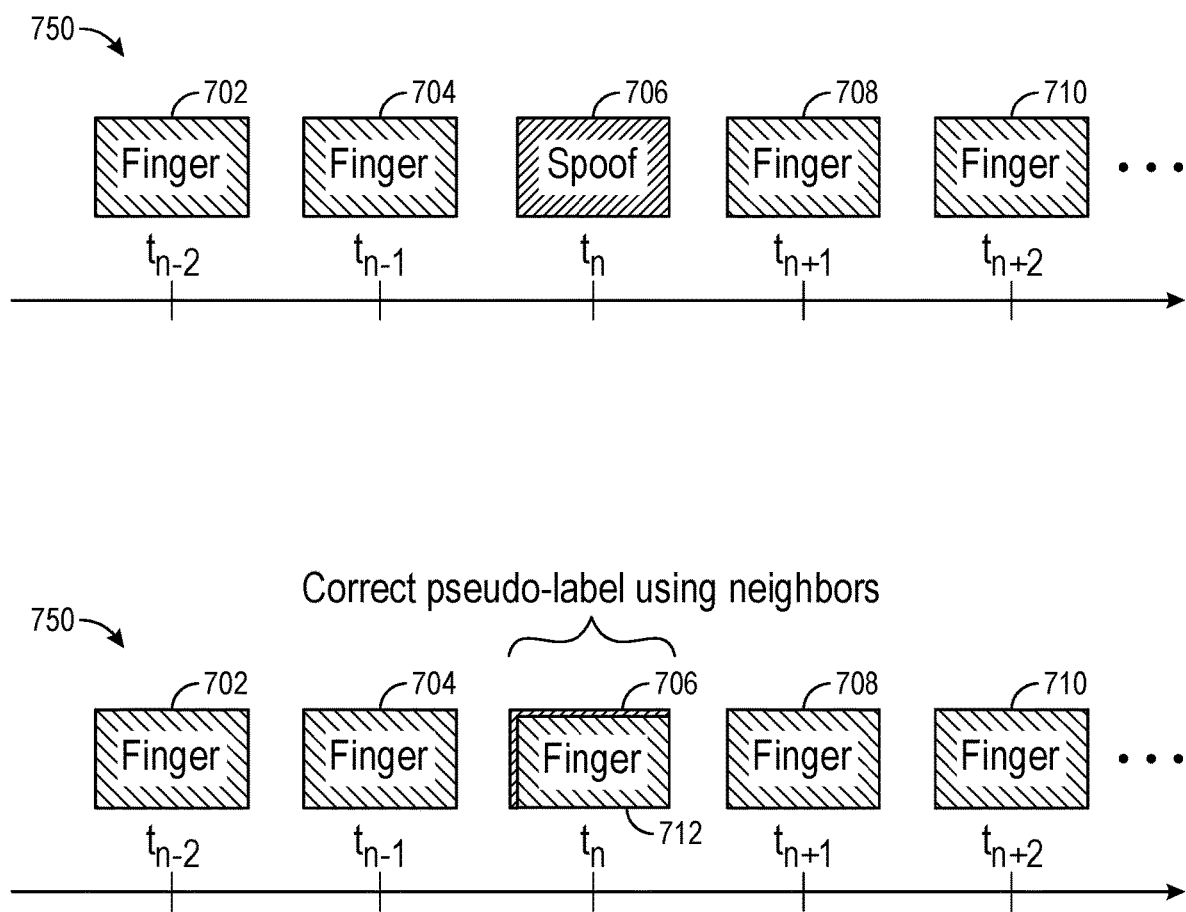
FIG. 7 illustrates example adjustment of labels for captured biometric data based on labels assigned to other captured biometric data, according to aspects of the present disclosure.

FIG. 7 illustrates an example adjustment of labels for captured biometric data based on labels assigned to other captured biometric data, according to aspects of the present disclosure. These adjustment techniques may be used, for example, to generate or correct the finetuning data set 446 illustrated in FIG. 4 as discussed above with respect to block 540 illustrated in FIG. 5.

As illustrated, in an example 700, a number of inputs 702, 704, 706, 708, and 710 may be received. The inputs 702, 704, 708, and 710 may be initially classified as authentic biometric data inputs, and the input 706 may be classified as an inauthentic biometric data input. However, contextual information associated with the timing and sequence information for the inputs 702, 704, 706, 708, and 710 may indicate that the input 706 is actually an authentic biometric input, since it is unlikely that an inauthentic biometric data source would be used to generate a biometric data input close in time to biometric data inputs generated using real data sources (e.g., corresponding to the inputs 702, 704, 708, and 710). Thus, as illustrated, in an example 750, the classification for the input 706 may be changed such that the label 712 for the input 706 corresponds to an authentic classification rather than an inauthentic classification.

Various techniques may be used to correct the classifications assigned to biometric data inputs in the finetuning data set. As illustrated in FIG. 7, one technique for correcting the classifications assigned to biometric data inputs may include using information about consecutive samples to determine the proper classification for a biometric data input in the finetuning data set.

In another example, temporal windowing may be used to determine the appropriate classification of the biometric data inputs within a time window. In still another example, the appropriate classification of a biometric data input may be determined and generated based on the classifications of other biometric data inputs with similar features. In this example, a set of biometric data inputs similar to a target biometric data input may be identified based on a distance between the target biometric data input and other biometric data inputs in the feature space. The set of biometric data inputs used to correct the classification assigned to the target biometric data input may be the biometric data inputs in the finetuning data set with distances from the target biometric data input less than a threshold distance.

Correction of the label assigned to a biometric data input may be based on various selection techniques. In one example, a majority vote scheme can be used to select the correct label for a group of biometric data inputs. As illustrated in FIG. 7, for example, it may be seen that four samples correspond to predictions of authentic biometric data inputs, while one sample (the input 706) corresponds to a prediction of an inauthentic biometric data input. Because the majority of samples in the example 700 are predicted to be authentic biometric data inputs, a majority vote scheme may cause the label assigned to the input 706 to be changed from an inauthentic label to an authentic label (e.g., as illustrated in the example 750).

In another example, weighted averages can be used to correct labels assigned to samples in the finetuning data set. To correct a label to a sample in the finetuning data set, a weight may be assigned to each biometric data input in a group of inputs, for example, based on a temporal proximity to a sample to be corrected, an order in which the samples are located in the finetuning data set relative to the sample to be corrected, feature space information, or the like. As an example, the weights may be applied such that samples closer to each other temporally have higher weights; for example, a weight assigned to the input 710 at time $t_{n+2}$ may be greater than a weight assigned to the input 708 at time $t_{n+1}$ when correcting the label 712 assigned to the input 706 at time $t_n$, and so on. The weighted average score may be used to determine the correct classification for each biometric data input in the group. Of course, it should be recognized that these are but a few examples of techniques that can be used to correct the labels assigned to biometric data inputs in the finetuning data set, and other interpolation techniques may also or alternatively be used.

Figure 8:
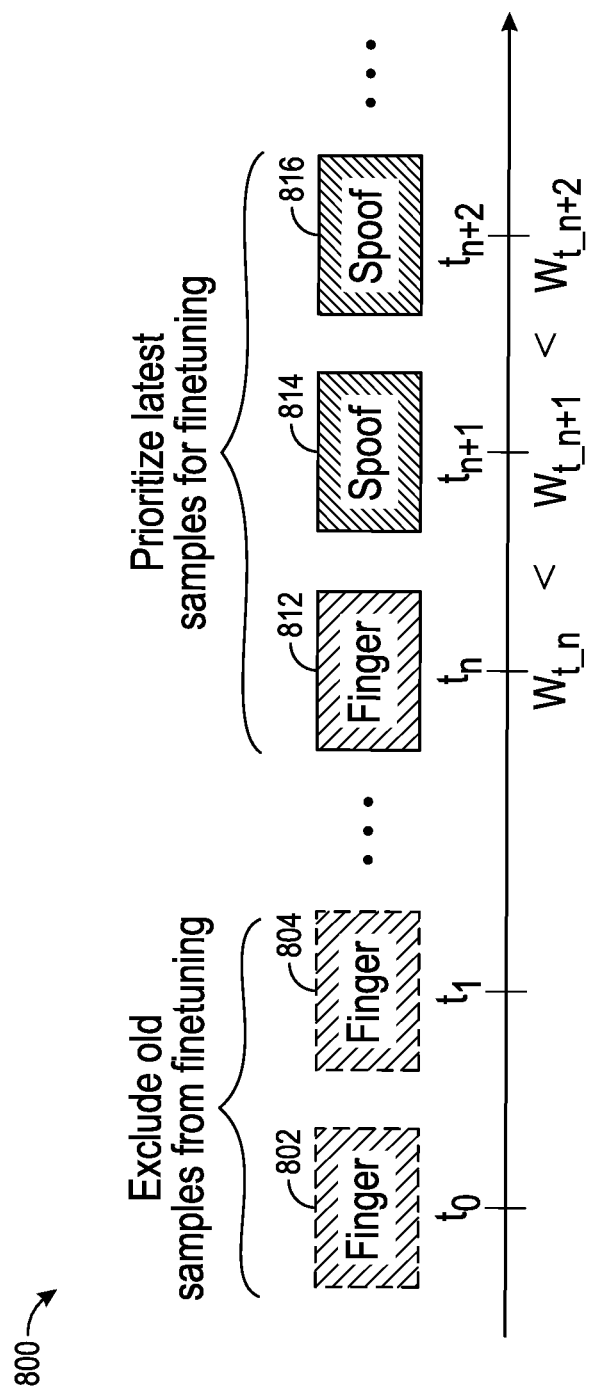
FIG. 8 illustrates example weighting of captured biometric data in a finetuning data set for adjusting an anti-spoofing protection model, according to aspects of the present disclosure.

FIG. 8 illustrates example weighting of captured biometric data in a finetuning data set for adjusting an anti-spoofing protection model, according to aspects of the present disclosure. These weighting techniques may be used, for example, to generate the finetuning data set 446 illustrated in FIG. 4 as discussed above with respect to block 540 illustrated in FIG. 5.

As illustrated, in an example 800, a set of samples with indices to through $t_{n+2}$ may exist in the finetuning data set. Samples older than a threshold age may be excluded from use in the finetuning data set. For example, it may be seen that samples 802 and 804, corresponding to samples captured at times $t_0$ and $t_1$, may be excluded from the finetuning data set (e.g., deleted, assigned a 0 weight, etc.), as these samples may be the oldest samples in the finetuning data set and may have at most an attenuated level of correspondence or relevance to current biometric data inputs processed through an anti-spoofing protection model, or may be assigned weights lower than weights assigned to the other samples in the finetuning data set. Meanwhile, samples 812, 814, and 816, corresponding to samples captured at times $t_n$, $t_{n+1}$, and $t_{n+2}$, may be included in the finetuning data set. These samples may be assigned weights that correspond to the relative freshness of these samples in the finetuning data set (e.g., such that the sample 816 is assigned the highest weight and the sample 812 is assigned the lowest weight, because the sample 812 is the oldest sample and the sample 816 is the newest sample).

By differentially weighting the samples in the finetuning data set used to retrain and refine an anti-spoofing protection model, aspects of the present disclosure may thus allow the anti-spoofing protection model to adjust to evolving biometric source and environment conditions over time, which may improve the accuracy of determinations of whether a biometric data input is captured from an authentic or inauthentic source.

Figure 9:
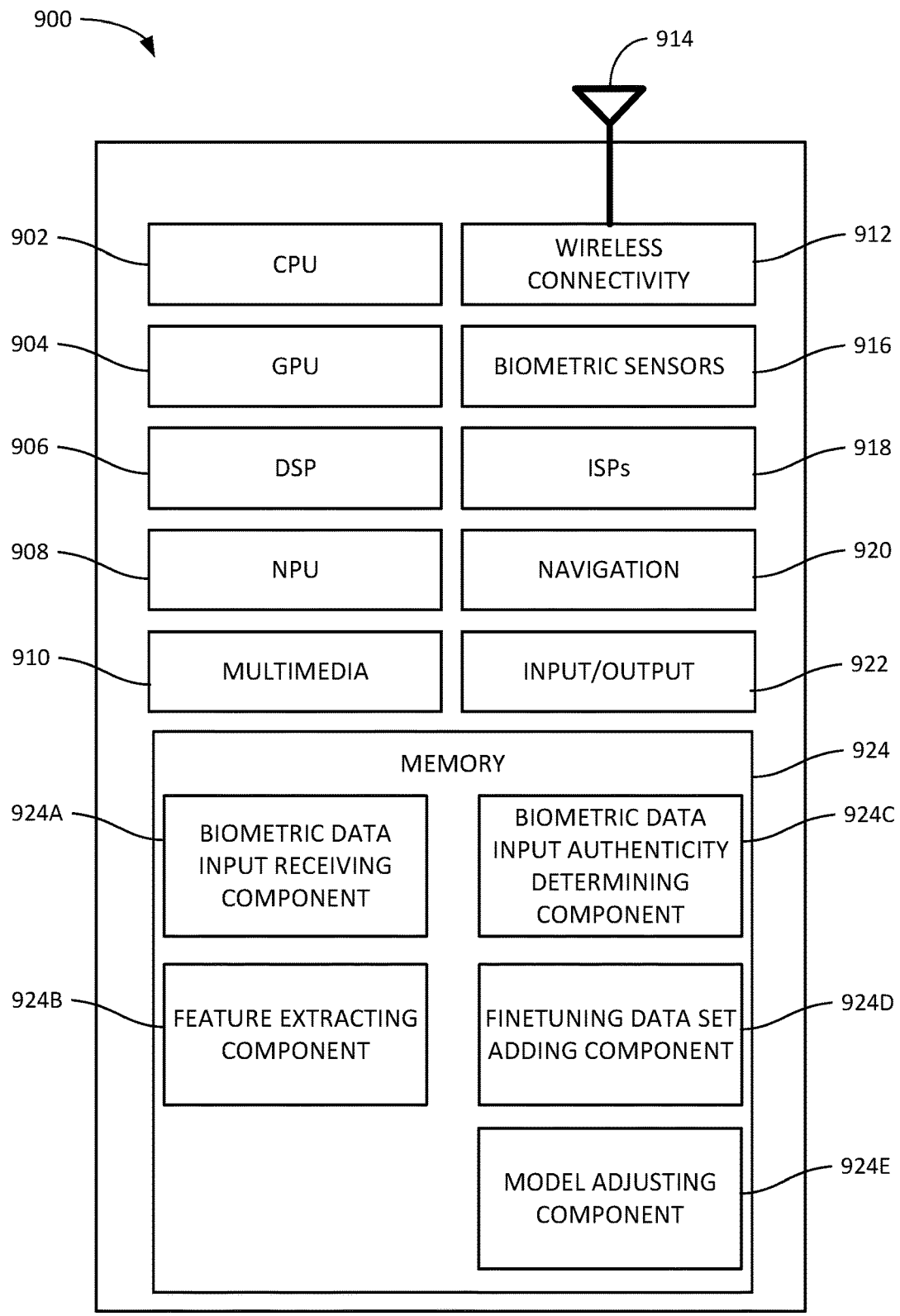
FIG. 9 illustrates an example implementation of a processing system in which biometric authentication and anti-spoofing protection within a biometric authentication pipeline can be performed, according to aspects of the present disclosure.

Example Processing System for Fingerprint Authentication Using Machine Learning-Based Anti-Spoofing Protection FIG. 9 depicts an example processing system 900 for authenticating biometric data and adjusting an anti-spoofing protection model for biometric authentication based on a finetuning data set generated from captured biometric data, such as described herein for example with respect to FIGS. 4 and 5.

Processing system 900 includes a central processing unit (CPU) 902, which in some examples may be a multi-core CPU. Instructions executed at the CPU 902 may be loaded, for example, from a program memory associated with the CPU 902 or may be loaded from a partition in memory 924.

Processing system 900 also includes additional processing components tailored to specific functions, such as a graphics processing unit (GPU) 904, a digital signal processor (DSP) 906, a neural processing unit (NPU) 908, a multimedia processing unit 910, and a wireless connectivity component 912.

An NPU, such as NPU 908, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 908, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In one implementation, NPU 908 is a part of one or more of CPU 902, GPU 904, and/or DSP 906.

In some examples, wireless connectivity component 912 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 912 is further connected to one or more antennas 914.

Processing system 900 may also include one or more sensor processing units 916 associated with any manner of biometric sensor (e.g., imaging sensors used to capture images of a biometric data source, ultrasonic sensors, depth sensors used to generate three-dimensional maps of a biometric feature, etc.), one or more image signal processors (ISPs) 918 associated with any manner of image sensor, and/or a navigation processor 920, which may include satellite-based positioning system components (e.g., GPS or GLONASS) as well as inertial positioning system components.

Processing system 900 may also include one or more input and/or output devices 922, such as screens, touch-sensitive surfaces (including touch-sensitive displays), physical buttons, speakers, microphones, and the like.

In some examples, one or more of the processors of processing system 900 may be based on an ARM or RISC-V instruction set.

Processing system 900 also includes memory 924, which is representative of one or more static and/or dynamic memories, such as a dynamic random access memory, a flash-based static memory, and the like. In this example, memory 924 includes computer-executable components, which may be executed by one or more of the aforementioned processors of processing system 900.

In particular, in this example, memory 924 includes biometric data input receiving component 924A, image feature extracting component 924B, biometric data input authenticity determining component 924C, finetuning data set adding component 924D, and model adjusting component 924E. The depicted components, and others not depicted, may be configured to perform various aspects of the methods described herein.

Generally, processing system 900 and/or components thereof may be configured to perform the methods described herein.

Notably, in other aspects, elements of processing system 900 may be omitted, such as where processing system 900 is a server computer or the like. For example, multimedia processing unit 910, wireless connectivity component 912, ISPs 918, and/or navigation processor 920 may be omitted in other aspects. Further, elements of processing system 900 may be distributed, such as training a model and using the model to generate inferences, such as user verification predictions.

EXAMPLE CLAUSES

Implementation details of various aspects of the present disclosure are described in the following numbered clauses.

Clause 1: A method, comprising: receiving a biometric data input for a user; extracting, through a first machine learning model, features for the received biometric data input; determining, using the extracted features for the received biometric data input and a second machine learning model, whether the received biometric data input for the user is authentic or inauthentic; determining whether to add the extracted features for the received biometric data input to a finetuning data set; and adjusting the second machine learning model based on the finetuning data set.

Clause 2: The method of Clause 1, wherein determining whether to add the features for the received biometric data input to the finetuning data set comprises determining whether to add the features and a label associated with the features based on whether the received biometric data input for the user is authentic or inauthentic.

Clause 3: The method of Clause 2, wherein determining whether to add the features and a label associated with the features based on whether the received biometric data input for the user is authentic or inauthentic comprises one of: adding the features and a label associated with the features for both authentic and inauthentic received biometric data inputs; adding the features and the label associated with the features only when the received biometric data input for the user is authentic; or adding the features and the label associated with the features only when the received biometric data input for the user is inauthentic.

Clause 4: The method of any of Clauses 1 through 3, wherein determining whether the received biometric data input for the user is authentic or inauthentic comprises generating a predictive score corresponding to a likelihood that the received biometric data input for the user is from a real biometric data source.

Clause 5: The method of Clause 4, wherein determining whether to add the extracted features for the received biometric data input to the finetuning data set comprises: determining that the predictive score exceeds a first threshold value or is less than a second threshold value; and based on the determining that the predictive score exceeds a first threshold value or is less than a second threshold value, adding the extracted features for the received biometric data input to the finetuning data set.

Clause 6: The method of Clause 5, wherein the first threshold value comprises a threshold value for biometric data inputs that are likely to correspond to data from real biometric sources and the second threshold value comprises a threshold value for biometric data inputs that are likely to correspond to data from inauthentic biometric sources.

Clause 7: The method of any of Clauses 4 through 6, wherein determining whether to add the extracted features for the received biometric data input to the finetuning data set comprises: adding the extracted features, labeled with an indication that the features correspond to data from an real biometric source, based on determining that the predictive score exceeds a threshold value; and adding the extracted features, labeled with an indication that the features correspond to data from an inauthentic biometric source, based on determining that the predictive score is less than the threshold value.

Clause 8: The method of any of Clauses 1 through 7, further comprising: determining that a label assigned to the extracted features for the received biometric data input is different from other biometric data inputs received within a threshold time from the received biometric data input; and changing the label assigned to the extracted features for the received biometric data input based on labels assigned to the other biometric data inputs.

Clause 9: The method of any of Clauses 1 through 8, further comprising: determining that a label assigned to the extracted features for the received biometric data input is different from a label assigned to other biometric data inputs having similar features as the extracted features; and changing the label assigned to the extracted features for the received biometric data input based on labels assigned to the other biometric data inputs having the similar features.

Clause 10: The method of any of Clauses 1 through 9, wherein adjusting the second machine learning model based on the finetuning data set comprises applying weights to the finetuning data set proportional to an age in time for each exemplar in the finetuning data set.

Clause 11: The method of Clause 10, wherein applying weights to the finetuning data set comprises assigning a zero weight to samples in the finetuning data set that are older than a threshold age.

Clause 12: The method of any of Clauses 1 through 11, wherein the finetuning data set comprises a pretraining data set and an online training data set, and wherein determining whether to add the extracted features for the received biometric data input to the finetuning data set comprises determining whether to add the extracted features for the biometric data input to the online training data set.

Clause 13: The method of Clause 12, wherein adjusting the second machine learning model based on the finetuning data set comprises adjusting the second machine learning model based on a first weight assigned to the pretraining data set and a second weight assigned to the online training data set.

Clause 14: A processing system, comprising: a memory comprising computer-executable instructions and one or more processors configured to execute the computer-executable instructions and cause the processing system to perform a method in accordance with any of Clauses 1-13.

Clause 15: A processing system, comprising means for performing a method in accordance with any of Clauses 1-13.

Clause 16: A non-transitory computer-readable medium comprising computer-executable instructions that, when executed by one or more processors of a processing system, cause the processing system to perform a method in accordance with any of Clauses 1-13.

Clause 15: A computer program product embodied on a computer-readable storage medium comprising code for performing a method in accordance with any of Clauses 1-11.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
   receiving, from a sensor, a biometric data input for a user;
   extracting, through a first machine learning model, features for the received biometric data input;
   determining, using the features for the received biometric data input and a second machine learning model, whether the received biometric data input for the user is authentic or inauthentic;
   determining whether to add the features for the received biometric data input to a finetuning data set;
   adjusting the second machine learning model based on the finetuning data set;
   determining that a label assigned to the features for the received biometric data input is different from a label assigned to other biometric data inputs having similar features as the features; and
   changing the label assigned to the features for the received biometric data input based on the label assigned to the other biometric data inputs having the similar features.

2. The method of claim 1, wherein determining whether to add the features for the received biometric data input to the finetuning data set comprises determining whether to add the features and a label associated with the features based on whether the received biometric data input for the user is authentic or inauthentic.

3. The method of claim 2, wherein determining whether to add the features and a label associated with the features based on whether the received biometric data input for the user is authentic or inauthentic comprises one of:
   adding the features and a label associated with the features for both authentic and inauthentic received biometric data inputs;
   adding the features and the label associated with the features only when the received biometric data input for the user is authentic; or
   adding the features and the label associated with the features only when the received biometric data input for the user is inauthentic.

4. The method of claim 1, wherein determining whether the received biometric data input for the user is authentic or inauthentic comprises generating a predictive score corresponding to a likelihood that the received biometric data input for the user is from a real biometric data source.

5. The method of claim 4, wherein determining whether to add the features for the received biometric data input to the finetuning data set comprises:
   determining that the predictive score exceeds a first threshold value or is less than a second threshold value; and
   based on the determining that the predictive score exceeds the first threshold value or is less than the second threshold value, adding the features for the received biometric data input to the finetuning data set.

6. The method of claim 5, wherein the first threshold value comprises a threshold value for biometric data inputs that are likely to correspond to data from real biometric sources and wherein the second threshold value comprises a threshold value for biometric data inputs that are likely to correspond to data from inauthentic biometric sources.

7. The method of claim 4, wherein determining whether to add the features for the received biometric data input to the finetuning data set comprises:
   adding the features, labeled with an indication that the features correspond to data from a real biometric source, based on determining that the predictive score exceeds a threshold value; and
   adding the features, labeled with an indication that the features correspond to data from an inauthentic biometric source, based on determining that the predictive score is less than the threshold value.

8. The method of claim 1, further comprising:
   determining that a label assigned to the features for the received biometric data input is different from other biometric data inputs received within a threshold time from the received biometric data input; and
   changing the label assigned to the features for the received biometric data input based on labels assigned to the other biometric data inputs.

9. The method of claim 1, wherein adjusting the second machine learning model based on the finetuning data set comprises applying weights to the finetuning data set proportional to an age in time for each exemplar in the finetuning data set.

10. The method of claim 9, wherein applying the weights to the finetuning data set comprises assigning a zero weight to samples in the finetuning data set that are older than a threshold age.

11. The method of claim 1, wherein the finetuning data set comprises a pretraining data set and an online training data set, and wherein determining whether to add the features for the received biometric data input to the finetuning data set comprises determining whether to add the features for the biometric data input to the online training data set.

12. The method of claim 11, wherein adjusting the second machine learning model based on the finetuning data set comprises adjusting the second machine learning model based on a first weight assigned to the pretraining data set and a second weight assigned to the online training data set.

13. A system, comprising:
   a memory comprising computer-executable instructions; and
   a processor configured to execute the computer-executable instructions in order to cause the system to:
      receive a biometric data input for a user;
      extract, through a first machine learning model, features for the received biometric data input;
      determine, using the features for the received biometric data input and a second machine learning model;
      determine whether to add the features for the received biometric data input, labeled with an indication of whether the received biometric data input is authentic or inauthentic, to a finetuning data set;
      adjust the second machine learning model based on the finetuning data set;
      determine that a label assigned to the features for the received biometric data input is different from a label assigned to other biometric data inputs having similar features as the features; and
      change the label assigned to the features for the received biometric data input based on the label assigned to the other biometric data inputs having the similar features.

14. The system of claim 13, wherein in order to determine whether to add the features for the received biometric data input to the finetuning data set, the processor is configured to cause the system to determine whether to add the features and a label associated with the features based on whether the received biometric data input for the user is authentic or inauthentic.

15. The system of claim 14, wherein in order to determine whether to add the features and a label associated with the features based on whether the received biometric data input for the user is authentic or inauthentic, the processor is configured to cause the system to:
   add the features and a label associated with the features for both authentic and inauthentic received biometric data inputs;
   add the features and the label associated with the features only when the received biometric data input for the user is authentic; or
   add the features and the label associated with the features only when the received biometric data input for the user is inauthentic.

16. The system of claim 13, wherein in order to determine whether the received biometric data input for the user is authentic or inauthentic, the processor is configured to cause the system to generate a predictive score corresponding to a likelihood that the received biometric data input for the user is from a real biometric data source.

17. The system of claim 16, wherein in order to determine whether to add the features for the received biometric data input to the finetuning data set, the processor is configured to cause the system to:
   determine that the predictive score exceeds a first threshold value or is less than a second threshold value; and
   based on the determining that the predictive score exceeds the first threshold value or is less than the second threshold value, add the features for the received biometric data input to the finetuning data set.

18. The system of claim 17, wherein the first threshold value comprises a threshold value for biometric data inputs that are likely to correspond to data from real biometric sources and wherein the second threshold value comprises a threshold value for biometric data inputs that are likely to correspond to data from inauthentic biometric sources.

19. The system of claim 16, wherein in order to determine whether to add the features for the received biometric data input to the finetuning data set, the processor is configured to cause the system to:
   add the features, labeled with an indication that the features correspond to data from a real biometric source, based on determining that the predictive score exceeds a threshold value; and
   add the features, labeled with an indication that the features correspond to data from an inauthentic biometric source, based on determining that the predictive score is less than the threshold value.

20. The system of claim 13, wherein the processor is further configured to cause the system to:
- determine that a label assigned to the features for the received biometric data input is different from other biometric data inputs received within a threshold time from the received biometric data input; and
- change the label assigned to the features for the received biometric data input based on labels assigned to the other biometric data inputs.

21. The system of claim 13, wherein in order to adjust the second machine learning model based on the finetuning data set, the processor is configured to cause the system to apply weights to the finetuning data set proportional to an age in time for each exemplar in the finetuning data set.

22. The system of claim 21, wherein in order to apply weights to the finetuning data set, the processor is configured to cause the system to assign a zero weight to samples in the finetuning data set that are older than a threshold age.

23. The system of claim 13, wherein the finetuning data set comprises a pretraining data set and an online training data set, and wherein determining whether to add the features for the received biometric data input to the finetuning data set comprises determining whether to add the features for the biometric data input to the online training data set.

24. The system of claim 23, wherein in order to adjust the second machine learning model based on the finetuning data set, the processor is configured to cause the system to adjust the second machine learning model based on a first weight assigned to the pretraining data set and a second weight assigned to the online training data set.

* * * * *